(12) United States Patent
Chahwan et al.

(10) Patent No.: US 8,913,338 B1
(45) Date of Patent: Dec. 16, 2014

(54) DISK DRIVE REDUCING WRITE UNSAFE THRESHOLD WHEN DETECTING AN UNRECOVERABLE SERVO COMPENSATION VALUE

(71) Applicant: Western Digital Technologies, Inc., Irvine, CA (US)

(72) Inventors: Alain Chahwan, Irvine, CA (US); Yanan Huang, Torrance, CA (US); Chuanwen Ji, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/924,791

(22) Filed: Jun. 24, 2013

Related U.S. Application Data

(60) Provisional application No. 61/829,089, filed on May 30, 2013.

(51) Int. Cl.
*G11B 19/04* (2006.01)
*G11B 5/596* (2006.01)

(52) U.S. Cl.
CPC .......... *G11B 19/045* (2013.01); *G11B 5/59627* (2013.01)
USPC ............................. 360/60; 360/77.04; 360/55

(58) Field of Classification Search
None
See application file for complete search history.

(56) References Cited

U.S. PATENT DOCUMENTS

| | | | |
|---|---|---|---|
| 6,671,119 B2 | 12/2003 | Baumann et al. | |
| 6,735,033 B1 | 5/2004 | Codilian et al. | |
| 6,853,511 B2 | 2/2005 | Seng et al. | |
| 6,882,489 B1 * | 4/2005 | Brunnett et al. | 360/60 |
| 6,975,468 B1 * | 12/2005 | Melrose et al. | 360/60 |
| 6,995,942 B2 * | 2/2006 | Schmidt | 360/77.04 |
| 6,999,266 B1 * | 2/2006 | Schmidt | 360/77.04 |
| 7,002,770 B2 * | 2/2006 | Schmidt | 360/77.08 |
| 7,023,649 B2 * | 4/2006 | Schmidt | 360/77.08 |
| 7,027,255 B2 * | 4/2006 | Schmidt | 360/77.08 |
| 7,130,142 B2 | 10/2006 | Hara | |
| 7,136,245 B2 * | 11/2006 | Mori et al. | 360/60 |
| 7,154,690 B1 * | 12/2006 | Brunnett et al. | 360/60 |
| 7,193,798 B2 | 3/2007 | Byrd et al. | |
| 7,253,982 B1 * | 8/2007 | Brunnett et al. | 360/60 |
| 7,423,828 B2 * | 9/2008 | Emo et al. | 360/60 |
| 7,474,491 B2 | 1/2009 | Liikanen et al. | |
| 7,502,283 B2 * | 3/2009 | Schmidt et al. | 369/13.11 |
| 7,545,593 B1 * | 6/2009 | Sun et al. | 360/60 |
| 7,570,445 B2 * | 8/2009 | Alfred et al. | 360/31 |
| 7,580,212 B1 | 8/2009 | Li et al. | |
| 7,633,698 B2 * | 12/2009 | Finamore et al. | 360/60 |

(Continued)

*Primary Examiner* — Wayne Young
*Assistant Examiner* — James L Habermehl

(57) ABSTRACT

A disk drive is disclosed comprising a disk comprising a plurality of servo tracks defined by servo sectors, wherein each servo sector comprises servo data and a servo compensation value. While servoing a head over a target data track during a write operation, a position error signal (PES) is generated at each servo sector based at least in part on the servo data. When the servo compensation value of a first servo sector is recoverable, the write operation is aborted when the PES generated at the first servo sector exceeds a first write unsafe threshold. When the servo compensation value of the first servo sector is unrecoverable, the write operation is aborted when the PES generated at the first servo sector exceeds a second write unsafe threshold less than the first write unsafe threshold.

22 Claims, 3 Drawing Sheets

(56) References Cited

U.S. PATENT DOCUMENTS

| | | | |
|---|---|---|---|
| 7,855,851 B2* | 12/2010 | Shirai | 360/77.04 |
| 8,315,006 B1* | 11/2012 | Chahwan et al. | 360/60 |
| 2004/0125496 A1* | 7/2004 | Schmidt | 360/77.08 |
| 2005/0128634 A1* | 6/2005 | Schmidt | 360/77.04 |
| 2005/0141129 A1* | 6/2005 | Schmidt et al. | 360/77.08 |
| 2005/0152057 A1* | 7/2005 | Schmidt | 360/60 |
| 2005/0152058 A1* | 7/2005 | Schmidt | 360/60 |
| 2005/0190480 A1 | 9/2005 | Mori et al. | |

\* cited by examiner

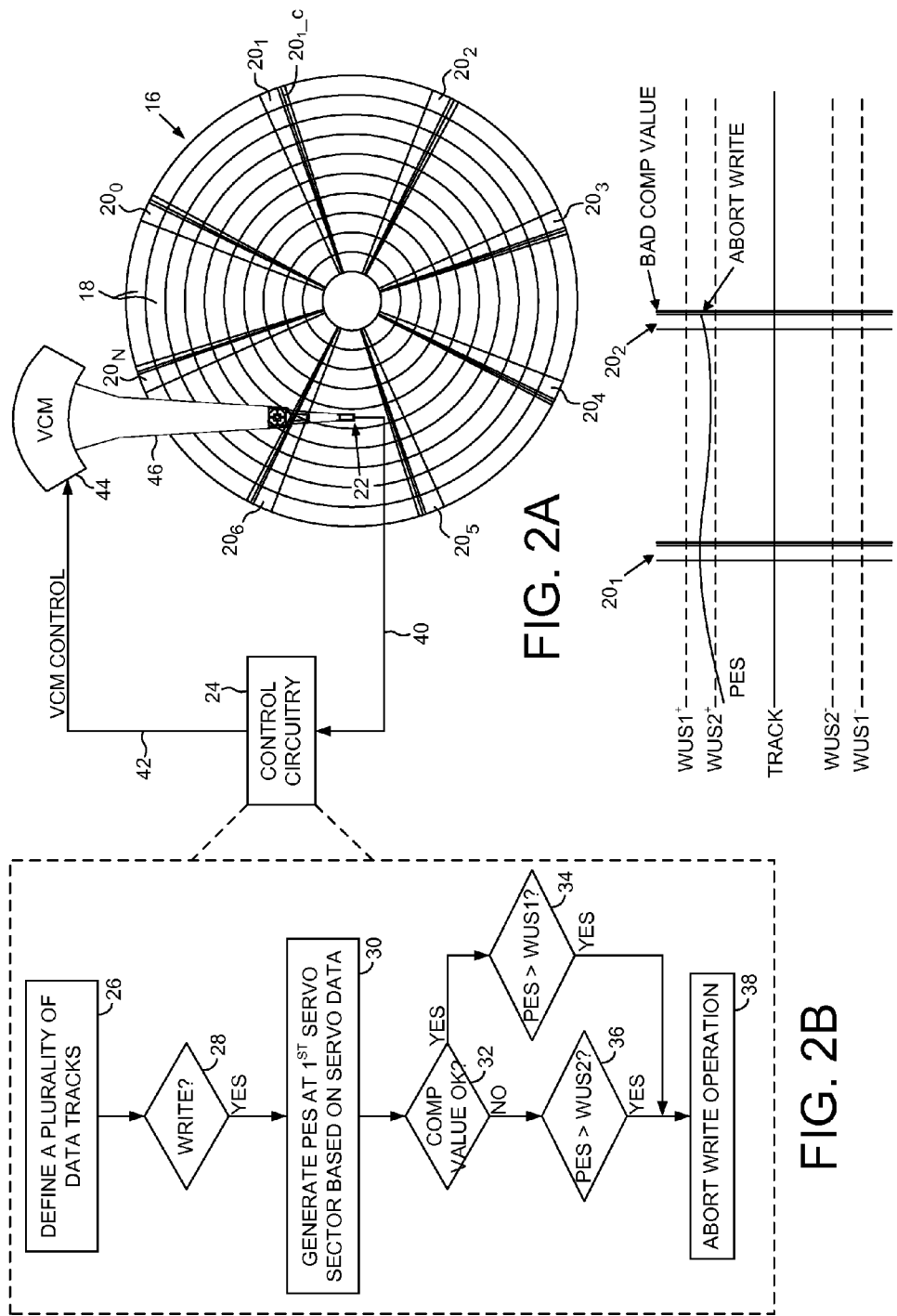

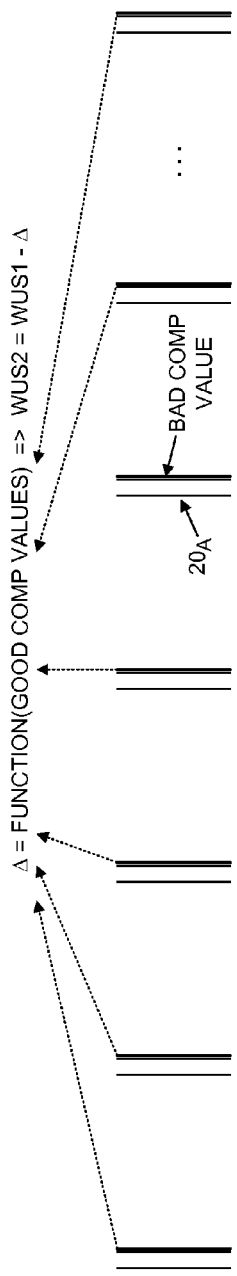
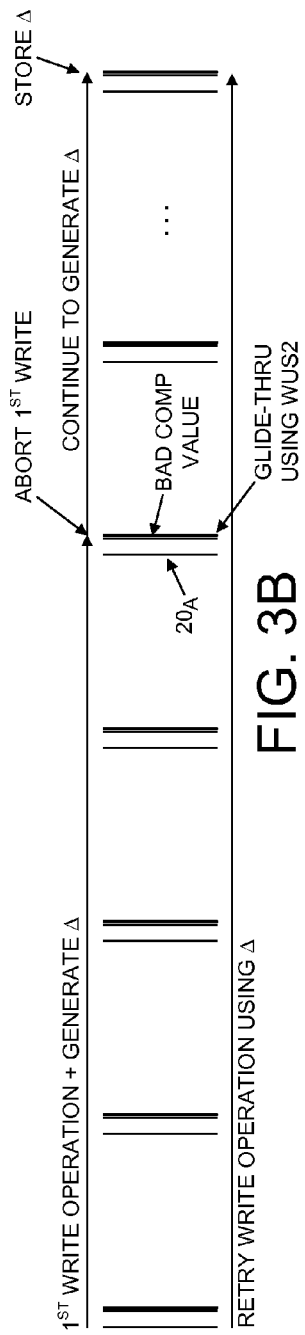
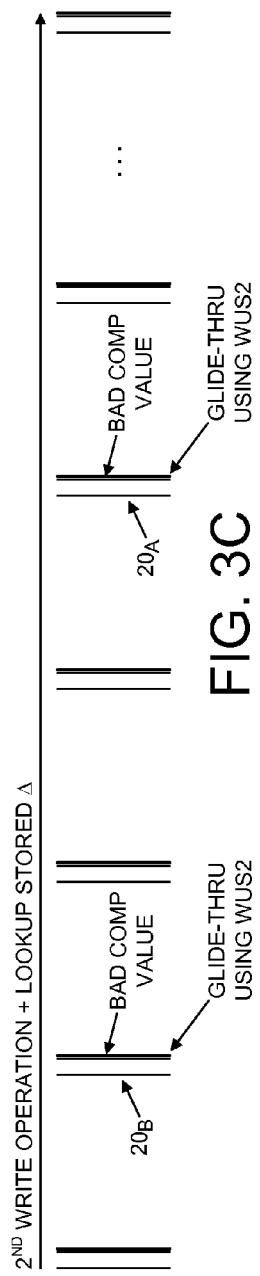
FIG. 3A
FIG. 3B
FIG. 3C

DISK DRIVE REDUCING WRITE UNSAFE THRESHOLD WHEN DETECTING AN UNRECOVERABLE SERVO COMPENSATION VALUE

CROSS-REFERENCE TO RELATED APPLICATIONS

This application claims priority to provisional U.S. Patent Application Ser. No. 61/829,089, filed on May 30, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a head actuated over a disk by control circuitry.

FIG. 2B is a flow diagram according to an embodiment wherein a write unsafe threshold is reduced when the servo compensation value of a servo sector is unrecoverable.

FIG. 2C illustrates an example of a reduced write unsafe threshold when the servo compensation value of a servo sector is unrecoverable.

FIG. 3A shows an embodiment wherein the write unsafe threshold is reduced based on a function of the servo compensation value of at least two other servo sectors in a servo track.

FIG. 3B shows an embodiment wherein a delta for reducing the write unsafe threshold is generated after aborting a write operation when a servo compensation values is unrecoverable, and then the reduced write unsafe threshold is used during a retry write operation.

FIG. 3C shows an embodiment wherein the delta for reducing the write unsafe threshold for a servo track is stored and used during subsequent write operations to the servo track.

DETAILED DESCRIPTION

Figure 1:
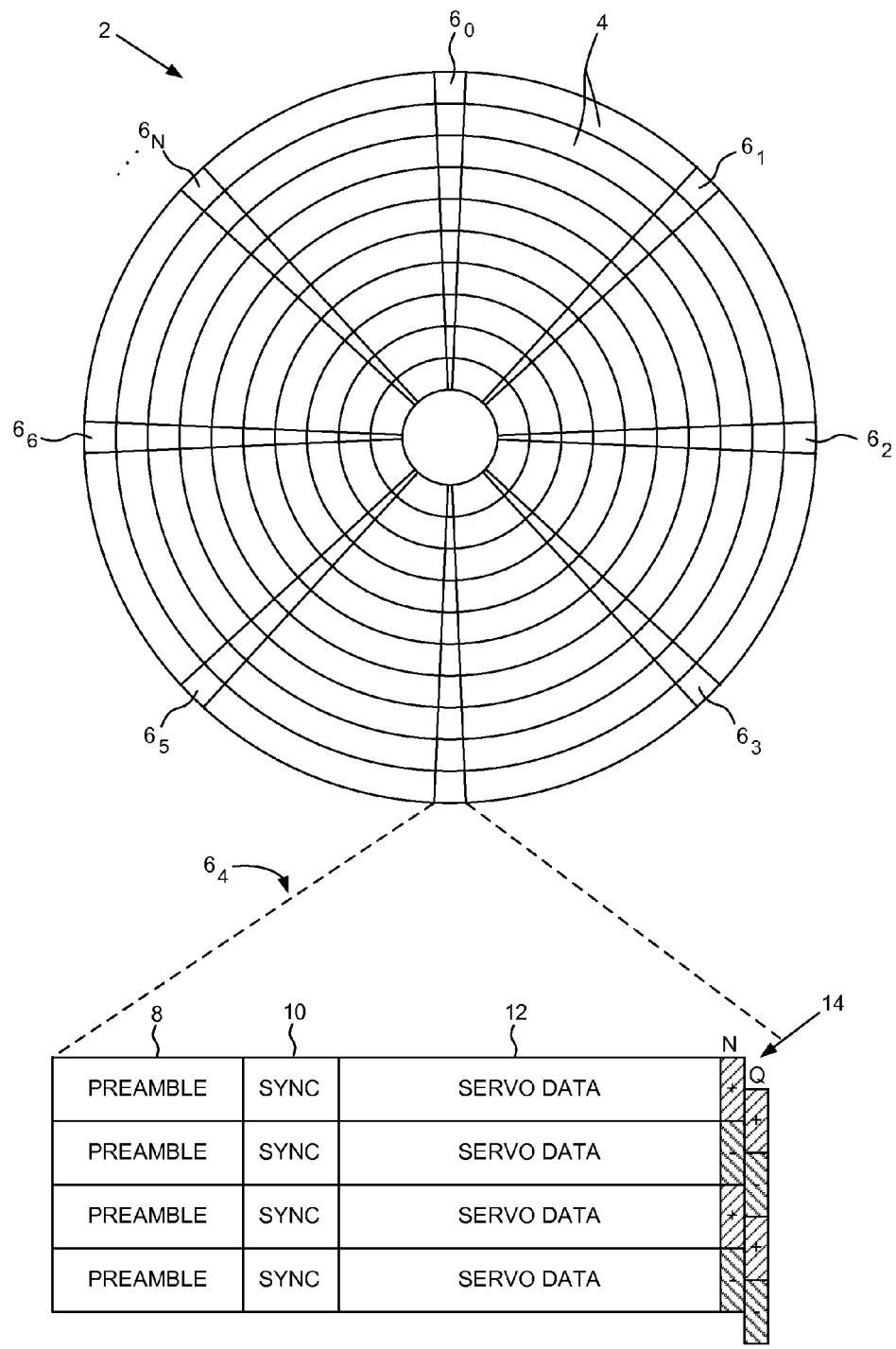
FIG. 1 shows a prior art disk format comprising a plurality of servo tracks defined by servo sectors, wherein each servo sector comprises servo data and a servo compensation value.

FIG. 2A shows a disk drive according to an embodiment comprising a head 22 actuated over a disk 16 comprising a plurality of servo tracks 18 defined by servo sectors $20_0$-$20_N$, wherein each servo sector comprises servo data and a servo compensation value (e.g., servo compensation value $20_{1\_c}$). The disk drive further comprises control circuitry 24 operable to execute the flow diagram of FIG. 2B, wherein a plurality of data tracks are defined relative to the servo tracks (block 26). While servoing the head over a target data track during a first write operation (block 28), a position error signal (PES) is generated at each servo sector based at least in part on the servo data (block 30). When the servo compensation value of a first servo sector is recoverable (block 32), the first write operation is aborted (block 38) when the PES generated at the first servo sector exceeds a first write unsafe threshold (block 34). When the servo compensation value of the first servo sector is unrecoverable (block 32), the first write operation is aborted (block 38) when the PES generated at the first servo sector exceeds a second write unsafe threshold less than the first write unsafe threshold (block 36).

In the embodiment of FIG. 2A, the control circuitry 24 processes a read signal 40 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

Each servo sector also comprises a compensation value, such as a repeatable runout (RRO) compensation value that compensates for a repeatable runout of the servo tracks due, for example, to written-in errors of the servo sectors $20_0$-$20_N$. In the embodiment shown in FIG. 2A, the compensation value is written following each servo sector (e.g., compensation value $20_{1\_c}$). For example, the compensation value may be learned during a calibration procedure, and then written as a separate field following each servo sector. During normal write/read access operations, the compensation value is read and used to adjust the PES, for example, subtracted from the PES to cancel the RRO from the servo system.

The control circuitry 24 may abort a normal write operation when the PES (or a predicted PES) exceeds a write unsafe threshold in order to prevent the head from overwriting data in an adjacent data track. The PES may exceed the write unsafe threshold when, for example, the disk drive is subjected to a vibration that disturbs the servo system. The PES is compared to the write unsafe threshold after being adjusted by the compensation value of each servo sector. However, if the compensation value of a servo sector is unrecoverable due, for example, to a defect on the disk, the non-adjusted PES cannot be reliably compared to the write unsafe threshold. For example, the compensation value may increase the PES so that it exceeds the write unsafe threshold, but this cannot be detected when the compensation value is unrecoverable. When a compensation value of a servo sector is unrecoverable, the write operation may be aborted to ensure an off-track write condition does not occur. However, aborting the write operation each time a compensation value is unrecoverable may increase the latency of the disk drive and/or result in a relocation of data wedges away from a defective servo sector which is undesirable.

To overcome these problems, in one embodiment the write unsafe threshold is reduced from a first write unsafe threshold to a lower, second write unsafe threshold when a compensation value of a servo sector is unrecoverable. An example of this embodiment is illustrated in FIG. 2C wherein the PES is compared to a first write unsafe threshold (WUS1) when the compensation values are recoverable, and compared to a second, lower write unsafe threshold (WUS2) when a compensation value of a servo sector is unrecoverable. In the example of FIG. 2C, the write operation is not aborted at servo sector $20_1$ since the compensation value is recoverable, whereas the write operation is aborted at servo sector $20_2$ since the compensation value is unrecoverable. If the non-adjusted PES had been less than WUS2 at servo sector $20_2$, the write operation would continue, thereby avoiding the latency of aborting the write operation and/or the performance degradation associated with relocating data wedges. In one embodiment, the adjustment to the positive WUS1$^+$ to generate WUS2$^+$ may be symmetric or asymmetric with the adjustment to the negative WUS1$^-$ to generate WUS2$^-$. In addition, the write unsafe threshold may be adjusted by offsetting the non-adjusted PES rather than by offsetting the WUS1 to generate WUS2 as shown in FIG. 2C.

The second, lower write unsafe threshold (WUS2) may be selected based on any suitable criterion (or criteria). In one embodiment, the WUS2 may be selected based on a predetermined worst case magnitude for the compensation value. This is equivalent to adding the worst case compensation value to the PES, and then comparing the adjusted PES to the normal WUS1 threshold. Accordingly, even under the worst case condition for the compensation value, the write operation need not be aborted since the adjusted PES will not exceed the WUS1 threshold. In one embodiment, the worst case magnitude for the compensation value may be determined based on the compensation values generated for the entire disk surface. In another embodiment, the worst case magnitude for the compensation value may be determined based on at least two recoverable compensation values of the same servo track.

This embodiment is understood with reference to FIG. 3A wherein when the compensation value at servo sector $20_A$ is unrecoverable, a delta ($\Delta$) is computed as a function of the other compensation values of the other servo sectors, wherein the second write unsafe threshold (WUS2) is generated by subtracting the $\Delta$ from the first write unsafe threshold (WUS1). In one embodiment, the $\Delta$ may be generated as the maximum compensation value out of the other servo sectors, and in another embodiment, the $\Delta$ may be generated based on a statistical measurement of the servo compensation values of the at least two other servo sectors of the servo track, such as a variance or a standard deviation of the other compensation values.

In another embodiment, the compensation value (e.g., RRO) for at least one servo sector of the target data track shown in FIG. 3A may be regenerated by convolving the non-adjusted PES measured at each servo sector with the inverse of the error rejection curve of the servo control system. The $\Delta$ for reducing the write unsafe threshold may then be generated based on the regenerated compensation value. For example, the $\Delta$ may be generated based on a statistical measurement of the compensate values regenerated for all of the servo sectors, including servo sector $20_A$. In another embodiment, only the compensation value for servo sector $20_A$ may be regenerated and used to generate the $\Delta$. For example, the regenerated compensation value for servo sector $20_A$ may be evaluated together with the compensation values read from the other servo sectors to generate a statistical measurement used to generate the $\Delta$. In another embodiment, the $\Delta$ may be generated based on the magnitude of the regenerated compensation value for servo sector $20_A$. In general, the $\Delta$ may be generated so as to reduce the probability that the PES plus the unrecoverable compensation value will not exceed the WUS1 if the PES alone does not exceed WUS2.

FIG. 3B shows an embodiment wherein during a first write operation the $\Delta$ is generated while reading the compensation value at each servo sector, and when the unrecoverable compensation value is encountered at servo sector $20_A$, the first write operation is aborted. However, the head remains on the target data track so that the compensation values of the remaining servo sectors may be read in order to finish generating the $\Delta$. The first write operation is then retried during a second revolution of the disk, and when the head reaches the servo sector $20_A$ comprising the unrecoverable compensation value, the retry write operation continues (glides through the servo sector $20_A$) if the PES is less than the WUS2.

In another embodiment, a $\Delta$ may be generated for each data track that comprises at least one unrecoverable compensation value. For example, the $\Delta$ may be generated during a manufacturing operation such as when executing a defect scan of the disk in order to identify the data tracks comprising an unrecoverable compensation value. In another embodiment, the $\Delta$ may be generated while accessing a data track during a normal write/read operation while the disk drive is deployed in the field. For each data track comprising an unrecoverable compensation value, the corresponding $\Delta$ may be stored in a lookup table. Referring to the example of FIG. 3B, the $\Delta$ generated for the data track may be saved after performing the retry write operation so that during a second write operation illustrated in FIG. 3C, the stored $\Delta$ may be used to generate the WUS2. In this manner, the servo system may glide through servo sector $20_A$ if the PES is less than WUS2 without having to perform a retry write operation as in FIG. 3B. In addition, the WUS2 generated using the stored $\Delta$ may also be used to glide through additional servo sectors (e.g., servo sector $20_B$) that may have an unrecoverable compensation value due, for example, to a grown defect on the disk that occurs over time.

In one embodiment, the control circuitry 24 may generate a predicted PES (pPES) at each servo sector during a write operation that predicts the value of the PES at a following servo sector. For example, in one embodiment the control circuitry may generate a predicted PES for a next servo sector based on:

$$p\text{PES}[k+1]=2 \cdot \text{PES}[k]-\text{PES}[k-1]$$

The control circuitry 24 may abort a write operation if the pPES exceeds a corresponding write unsafe threshold (pWUS1). In one embodiment, the pWUS1 threshold is less than the normal WUS1 threshold to compensate for the error in generating the pPES. In one embodiment, when the compensation value of servo sector k is unrecoverable, the PES[k] in the above equation may be generated with a zero compensation value, and the pPES[k+1] may be compared to a pWUS2 threshold that is less than the pWUS1 threshold. For example, the pWUS2 threshold may be generated by subtracting the Δ described above from the pWUS1 threshold. In this manner when an unrecoverable compensation value is encountered during a write operation, the servo system may continue the write operation if the pPES[k+1] is less than the lower pWUS2 threshold.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising a plurality of servo tracks defined by servo sectors, wherein each servo sector comprises servo data and a servo compensation value;
    a head actuated over the disk; and
    control circuitry operable to:
        define a plurality of data tracks relative to the servo tracks; and
        while servoing the head over a target data track during a first write operation:
            generate a position error signal (PES) at each servo sector based at least in part on the servo data;
            when the servo compensation value of a first servo sector is recoverable, abort the first write operation when the PES generated at the first servo sector exceeds a first write unsafe threshold;
            when the servo compensation value of the first servo sector is unrecoverable, abort the first write operation when the PES generated at the first servo sector exceeds a second write unsafe threshold less than the first write unsafe threshold;
        recover the servo compensation value from at least two other servo sectors in the target data track; and
        generate the second write unsafe threshold based on the servo compensation values recovered from the at least two other servo sectors.

2. The disk drive as recited in claim 1, wherein the control circuitry is operable to generate the second write unsafe threshold based on a maximum servo compensation value of the at least two other servo sectors of the target data track.

3. The disk drive as recited in claim 1, wherein the control circuitry is operable to generate the second write unsafe threshold based on a statistical measurement of the servo compensation values of the at least two other servo sectors of the target data track.

4. The disk drive as recited in claim 3, wherein the statistical measurement comprises a variance of the servo compensation values of the at least two other servo sectors of the target data track.

5. The disk drive as recited in claim 3, wherein the statistical measurement comprises a standard deviation of the servo compensation values of the at least two other servo sectors of the target data track.

6. The disk drive as recited in claim 1, wherein the control circuitry is further operable to:
    regenerate the servo compensation value for at least one servo sector of the target data track based on the PES generated for each servo sector; and
    generate the second write unsafe threshold based on the regenerated servo compensation value.

7. The disk drive as recited in claim 1, wherein the servo compensation value comprises a repeatable runout of the servo sectors of the target data track.

8. The disk drive as recited in claim 1, wherein when the servo compensation value of the first servo sector is unrecoverable the control circuitry is further operable to retry the first write operation using the second write unsafe threshold at the first servo sector.

9. The disk drive as recited in claim 1, wherein the control circuitry is further operable to:
    save the second write unsafe threshold for the target data track; and
    while servoing the head over the target data track during a second write operation, abort the second write operation when the PES generated at the first servo sector exceeds the second write unsafe threshold.

10. The disk drive as recited in claim 9, wherein when the servo compensation value of a second servo sector of the target data track is unrecoverable during the second write operation, the control circuitry is further operable to abort the second write operation when the PES generated at the second servo sector exceeds the second write unsafe threshold.

11. A method of operating a disk drive comprising a disk comprising a plurality of servo tracks defined by servo sectors, wherein each servo sector comprises servo data and a servo compensation value, and a head actuated over the disk, the method comprising:
   defining a plurality of data tracks relative to the servo tracks; and
   while servoing the head over a target data track during a first write operation:
   generating a position error signal (PES) at each servo sector based at least in part on the servo data;
   when the servo compensation value of a first servo sector is recoverable, aborting the first write operation when the PES generated at the first servo sector exceeds a first write unsafe threshold;
   when the servo compensation value of the first servo sector is unrecoverable, aborting the first write operation when the PES generated at the first servo sector exceeds a second write unsafe threshold less than the first write unsafe threshold;
   recovering the servo compensation value from at least two other servo sectors in the target data track; and
   generating the second write unsafe threshold based on the servo compensation values recovered from the at least two other servo sectors.

12. The method as recited in claim 11, further comprising generating the second write unsafe threshold based on a maximum servo compensation value of the at least two other servo sectors of the target data track.

13. The method as recited in claim 11, further comprising generating the second write unsafe threshold based on a statistical measurement of the servo compensation values of the at least two other servo sectors of the target data track.

14. The method as recited in claim 13, wherein the statistical measurement comprises a variance of the servo compensation values of the at least two other servo sectors of the target data track.

15. The method as recited in claim 13, wherein the statistical measurement comprises a standard deviation of the servo compensation values of the at least two other servo sectors of the target data track.

16. The method as recited in claim 11, further comprising:
   regenerating the servo compensation value for at least one servo sector of the target data track based on the PES generated for each servo sector; and
   generating the second write unsafe threshold based on the regenerated servo compensation value.

17. The method as recited in claim 11, wherein the servo compensation value comprises a repeatable runout of the servo sectors of the target data track.

18. The method as recited in claim 11, wherein when the servo compensation value of the first servo sector is unrecoverable the method further comprises retrying the first write operation using the second write unsafe threshold at the first servo sector.

19. The method as recited in claim 11, further comprising:
   saving the second write unsafe threshold for the target data track; and
   while servoing the head over the target data track during a second write operation, aborting the second write operation when the PES generated at the first servo sector exceeds the second write unsafe threshold.

20. The method as recited in claim 19, wherein when the servo compensation value of a second servo sector of the target data track is unrecoverable during the second write operation, the method further comprises aborting the second write operation when the PES generated at the second servo sector exceeds the second write unsafe threshold.

21. A disk drive comprising:
   a disk comprising a plurality of servo tracks defined by servo sectors, wherein each servo sector comprises servo data and a servo compensation value;
   a head actuated over the disk; and
   control circuitry operable to:
   define a plurality of data tracks relative to the servo tracks; and
   while servoing the head over a target data track during a first write operation:
   generate a position error signal (PES) at each servo sector based at least in part on the servo data;
   when the servo compensation value of a first servo sector is recoverable, abort the first write operation when the PES generated at the first servo sector exceeds a first write unsafe threshold;
   when the servo compensation value of the first servo sector is unrecoverable, abort the first write operation when the PES generated at the first servo sector exceeds a second write unsafe threshold less than the first write unsafe threshold;
   regenerate the servo compensation value for at least one servo sector of the target data track based on the PES generated for each servo sector; and
   generate the second write unsafe threshold based on the regenerated servo compensation value.

22. A method of operating a disk drive comprising a disk comprising a plurality of servo tracks defined by servo sectors, wherein each servo sector comprises servo data and a servo compensation value, and a head actuated over the disk, the method comprising:
   defining a plurality of data tracks relative to the servo tracks; and
   while servoing the head over a target data track during a first write operation:
   generating a position error signal (PES) at each servo sector based at least in part on the servo data;
   when the servo compensation value of a first servo sector is recoverable, aborting the first write operation when the PES generated at the first servo sector exceeds a first write unsafe threshold;
   when the servo compensation value of the first servo sector is unrecoverable, aborting the first write operation when the PES generated at the first servo sector exceeds a second write unsafe threshold less than the first write unsafe threshold;
   regenerating the servo compensation value for at least one servo sector of the target data track based on the PES generated for each servo sector; and
   generating the second write unsafe threshold based on the regenerated servo compensation value.

* * * * *